US010222596B2

(12) United States Patent
Englert et al.

(10) Patent No.: US 10,222,596 B2
(45) Date of Patent: Mar. 5, 2019

(54) OMNIDIRECTIONAL CATADIOPTRIC LENS STRUCTURE

(71) Applicant: SPHERE OPTICS COMPANY, LLC, Syracuse, NY (US)

(72) Inventors: Robert S. Englert, Jamesville, NY (US); Meyer J. Giordano, Syracuse, NY (US)

(73) Assignee: SPHERE OPTICS COMPANY, LLC, Syracuse, NY (US)

(*) Notice: Subject to any disclaimer, the term of this patent is extended or adjusted under 35 U.S.C. 154(b) by 0 days.

(21) Appl. No.: 15/513,363

(22) PCT Filed: Oct. 16, 2014

(86) PCT No.: PCT/US2014/060855
§ 371 (c)(1),
(2) Date: Mar. 22, 2017

(87) PCT Pub. No.: WO2016/048386
PCT Pub. Date: Mar. 31, 2016

(65) Prior Publication Data
US 2017/0322400 A1    Nov. 9, 2017

Related U.S. Application Data

(60) Provisional application No. 62/055,163, filed on Sep. 25, 2014.

(51) Int. Cl.
*G02B 17/08* (2006.01)
*G02B 13/06* (2006.01)
(Continued)

(52) U.S. Cl.
CPC ............. *G02B 17/08* (2013.01); *G02B 13/06* (2013.01); *G02B 17/0808* (2013.01); *G03B 37/00* (2013.01); *G03B 37/06* (2013.01)

(58) Field of Classification Search
CPC ........ G02B 13/06; G02B 17/08; G03B 37/00; G03B 37/04
(Continued)

(56) References Cited

U.S. PATENT DOCUMENTS 3,283,653 A * 11/1966 Tokarzewski ............ G02B 3/08
                                                    359/725
6,333,826 B1 * 12/2001 Charles .................. G02B 13/06
                                                    359/725
(Continued)

FOREIGN PATENT DOCUMENTS

WO    WO0219009 A2    3/2002

OTHER PUBLICATIONS

Russian Patent Office International Search Report dated Jun. 25, 2015 re PCT Application No. PCT/US/2014/060855 of Sphere Optics Company, LLC, assignee of RAM Industrial Design, Inc.

*Primary Examiner* — Darryl J Collins
(74) *Attorney, Agent, or Firm* — Patrick J. Daugherty; Daugherty & Zel Zoppo Co., LPA

(57) ABSTRACT

At least one lens element defines a cylindrical void that encloses a conical element having a conical mirror surface defined about a common vertical axis upward from a tip on a generally 45-degree angle to the vertical axis. The lens element(s) have cross-sectional shapes defined relative to a plane passing through the lens element and including the vertical axis, the cross-sectional shape constant in rotation about the vertical axis and imparting a generally toroid shape to the lens element(s) for capturing image information from a surrounding scene and translating the captured light into a horizontal projection is oriented toward the conical mirror surface, which reflects the projection 90 degrees vertically downward toward an image plane of a light
(Continued)

sensitive sensor for generating a photographic representation of the surrounding scene.

14 Claims, 11 Drawing Sheets

(51) Int. Cl.
    *G03B 37/06*     (2006.01)
    *G03B 37/00*     (2006.01)

(58) Field of Classification Search
    USPC ........ 359/725, 726, 733–736, 741, 796, 797
    See application file for complete search history.

(56) References Cited

U.S. PATENT DOCUMENTS

| | | |
|---|---|---|
| 2001/0010555 A1 | 8/2001 | Driscoll, Jr. |
| 2002/0141028 A1 | 10/2002 | Hagler |
| 2010/0174507 A1* | 7/2010 | Vogel ............... G01B 11/26 702/151 |
| 2013/0077063 A1 | 3/2013 | Hirata et al. |
| 2013/0229668 A1* | 9/2013 | Werber ............. G02B 26/005 356/614 |

\* cited by examiner

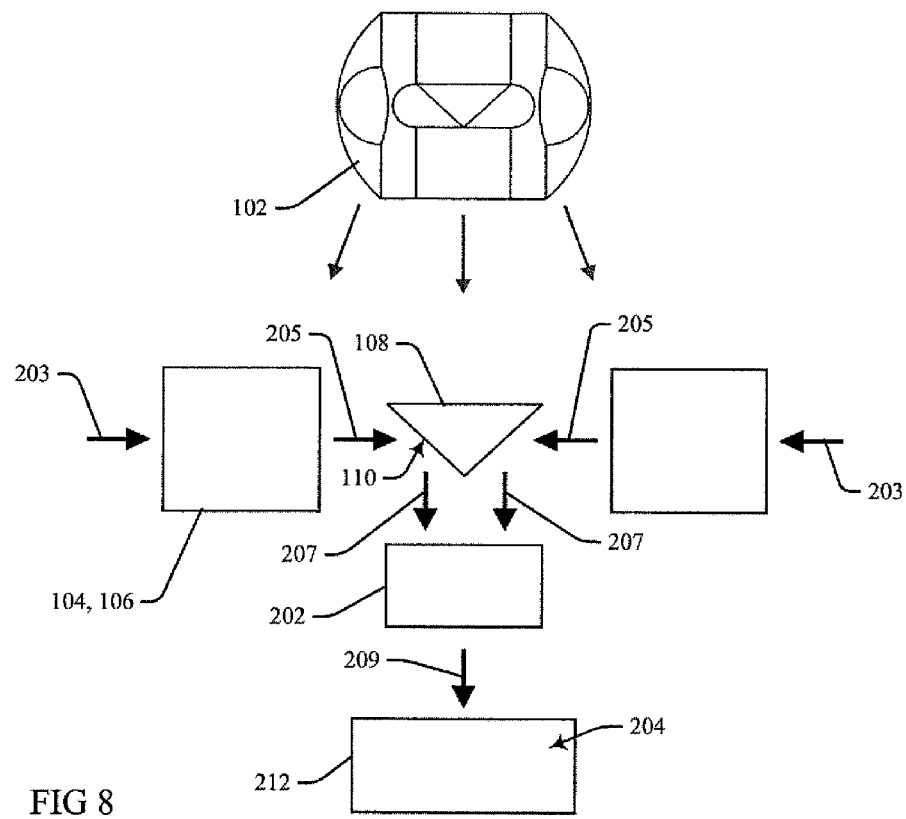
FIG 8
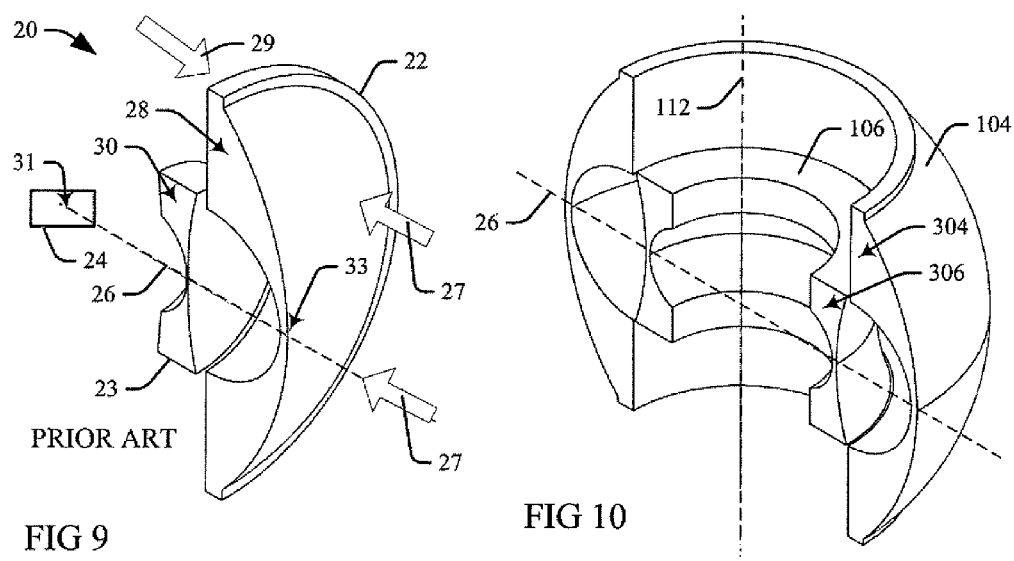
FIG 9 PRIOR ART
FIG 10

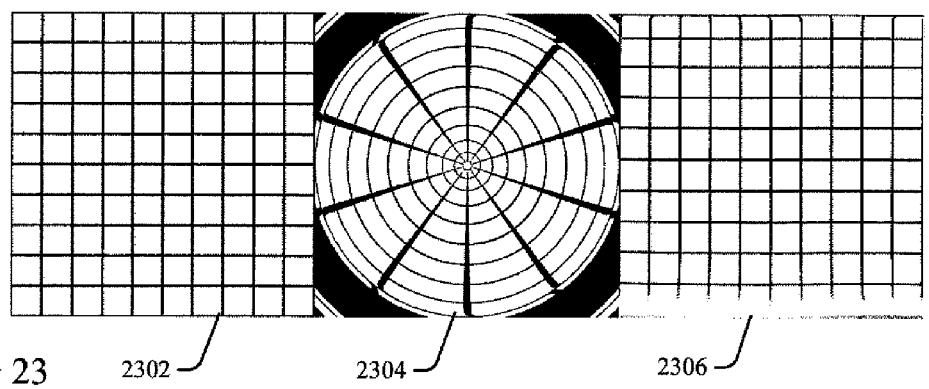
FIG 23    2302    2304    2306
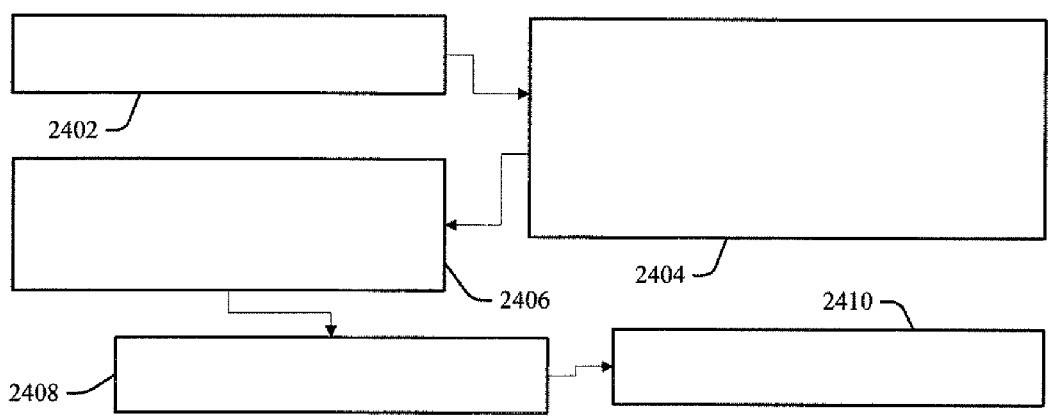
FIG 24
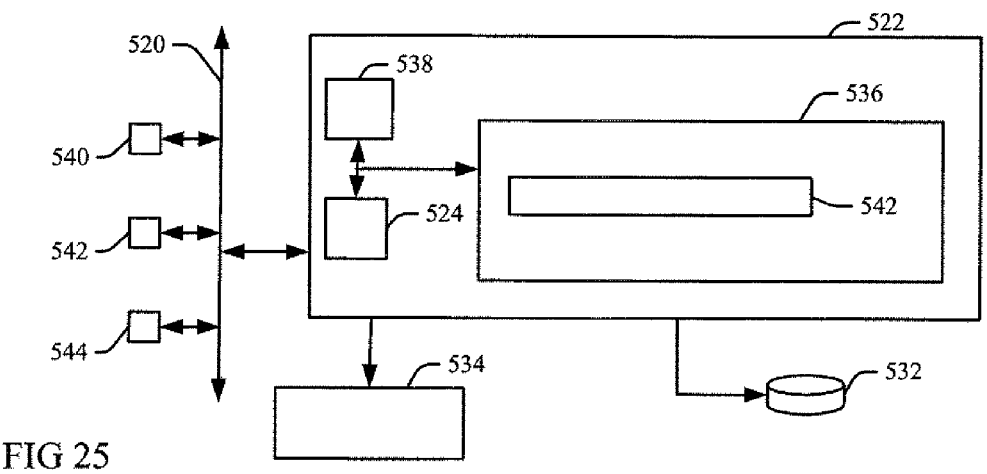
FIG 25

OMNIDIRECTIONAL CATADIOPTRIC LENS STRUCTURE

FIELD OF THE INVENTION

Aspects of the present invention relate to capturing visual image information from a surrounding environment for use in photographic recreations and representations.

BACKGROUND

Photographic depictions, transmissions, recreations and representations of the real world may capture image information representative of visible physical surroundings by using lens elements to focus light information on recording or transmission mediums (for example, camera sensors, film, light sensitive arrays, etc.) Images may be captured and stored for later viewing, or transmitted live, to a wide variety of end users both locally and distantly located relative to the environment providing the imagery.

Virtual reality (VR) refers to the replacement of sensory perception data of an environment inhabited by a user with computer-generated data, in some aspects to enable a user to experience an entirely different world from the present physical location of the user. For example, a user at home during cold winter months may engage a VR device to convey imagery and sounds from a beach vacation destination many miles away. Augmented reality (AR) refers to presentations of combinations of real-world and generated elements, sometimes by processing a camera feed through a computer to add generated elements before displaying it to the user, such as a heads-up display of navigation routing overlay that is superimposed on a camera feed of a street presently being traveled by the user. Some systems may provide both VR and AR capabilities, wherein an AR display device that blends real-world camera image feeds with computer generated data may be used to generate VR displays by dropping the real-world image data from a camera feed, leaving only generated or artificial world views.

BRIEF SUMMARY

In one aspect of the present invention, a system includes a conical element defined about a vertical axis and having a tip on the vertical axis, and a conical mirror surface that is defined upward from the tip on a generally 45-degree angle to the vertical axis; and at least one lens element disposed about the conical element, wherein the at least one lens element defines a generally cylindrical void that encloses the conical element, wherein the at least one lens element has a cross-sectional shape defined relative to a plane passing through the at least one lens element and including the vertical axis, wherein the at least one lens element cross-sectional shape is constant in rotation about the vertical axis and imparts a generally toroid shape to the at least one lens element relative to the vertical axis. The cross-sectional shape of the at least one lens element is selected to capture light data input from a surrounding scene and translate the captured light data into a horizontal orientation toward the conical mirror surface, which is reflected by the conical mirror surface 90 degrees vertically downward into downward image projection data toward an image plane for receipt by at least one light sensitive sensor. The at least one lens element is a plurality of lens elements that includes: an outer negative meniscus element that has a first cross-sectional shape that captures the light input from a surrounding scene and translates the captured light input into a first projection of the captured light data that is oriented toward the conical mirror surface on a first generally horizontal orientation; and a biconcave inner element that is disposed between the outer negative meniscus element and the conical element and that has a second cross-sectional shape that translates the first projection of the captured light data from the outer negative meniscus element into a second projection toward the conical mirror surface, wherein the second projection has a second generally horizontal orientation that is different from the first generally horizontal orientation.

In another aspect, a method for capturing image information from a surrounding scene and generating a photographic representation of the surrounding scene includes capturing light input from a surrounding scene via at least one lens element that is disposed about a conical element, wherein the conical element is defined about a vertical axis and has a tip on the vertical axis, wherein the conical element has a conical mirror surface that is defined upward from the tip on a generally 45 degree angle to the vertical axis, wherein the at least one lens element defines a generally cylindrical void that encloses the conical element, wherein the at least one lens element has a cross-sectional shape defined relative to a plane passing through the at least one lens element and including the vertical axis, wherein the at least one lens element cross-sectional shape is constant in rotation about the vertical axis and imparts a generally toroid shape to the at least one lens element relative to the vertical axis; translating, as function of the cross-sectional shape of the at least one lens element, the captured light input into at least one horizontal projection that is oriented toward the conical mirror surface; and reflecting, via the conical mirror surface, the at least one horizontal projection of the captured light input 90 degrees vertically downward into downward image projection data toward an image plane for receipt by at least one light sensitive sensor; wherein at least one lens element is a plurality of lens elements that includes an outer negative meniscus element and a biconcave inner element that is disposed between the outer negative meniscus element and the conical element. The method further includes capturing, as a function of a first cross-sectional shape of the outer negative meniscus element, the light input from a surrounding scene; translating, as a function of the first cross-sectional shape of the outer negative meniscus element, the light input captured from the surrounding scene into a first projection of the captured light data that is oriented toward the conical mirror surface on a first generally horizontal orientation; and translating, as a function of a second cross-sectional shape of the biconcave inner element, the first projection of the captured light data from the outer negative meniscus element into a second projection toward the conical mirror surface, wherein the second projection has a second generally horizontal orientation that is different from the first generally horizontal orientation.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 8 is a diagrammatic view of a lens structure according to the present invention.

FIG. 9 is a perspective view of a cross-sectional view of a prior art lens.

FIG. 10 is a perspective view of a cross-sectional view of refractive fisheye lens elements according to the present invention.

FIG. 23 provides graphic illustrations of rectilinear representations and polar transformations according to the present invention.

FIG. 24 is a block diagram representation of a method according to the present invention.

FIG. 25 depicts a computerized aspect according to an embodiment of the present invention.

DETAILED DESCRIPTION

The ability to acquire visual imagery and image information over a full 360 degree horizontal by 180 degree vertical field of view (an "omnidirectional" field of view) is desirable for VR video production and other applications. Examples include first person remote control of robotics, surveillance and security monitoring, exploration of inaccessible spaces (collapsed structures, the interior of the human body), computer vision, and still others will be apparent to one skilled in the art.

Figure 1:
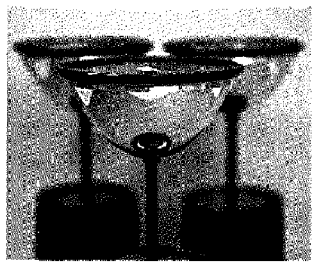
FIG. 1 is a graphic illustration of a prior art parabolic mirrors structure.
Figure 2:
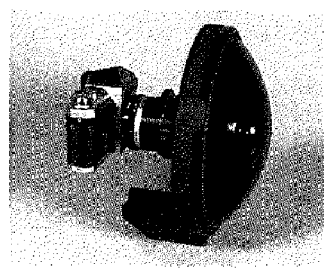
FIG. 2 is a graphic illustration of a prior art fisheye lens structure.

FIG. 1 illustrates a prior art parabolic mirrors structure. A curved mirror mounted in front of a normal camera lens reflects light coming in from all angles horizontally into the camera. Examples include devices provided by GoPano-.com, The 0-360 Panoramic Optic™ by 0-360.com, and the "Eye mirror" provided by eye-mirror.com. FIG. 2 illustrates a prior art extreme fisheye lens structure, a conventional photographic fisheye lens with an extremely wide angle. Examples include a 6 mm fisheye lens by Nikon; an iboolo 235 degree Super Fisheye Lens; the 360Fly by VOXX Electronics Corp (360fly.com); and the ibi by Tamaggo (tamaggo.com) that provides a 360×200 degree field of view.

Figure 4:
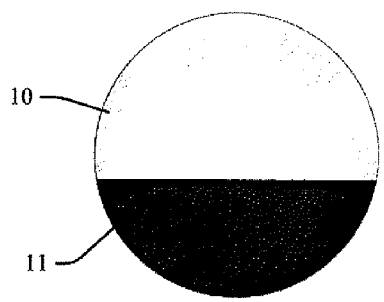
FIG. 4 is a graphic illustration of a lens field of view.
Figure 5:
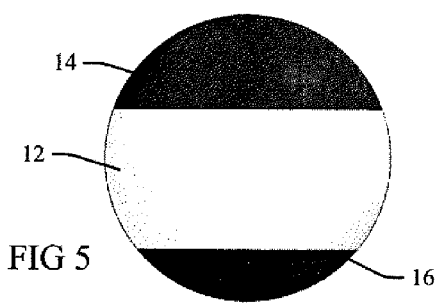
FIG. 5 is a graphic illustration of another lens field of view.

Conventional fish eye and parabolic lens may provide a horizontal field of view with a full 360 degrees of coverage, but the vertical angle is limited. As illustrated in FIG. 4, a conventional fisheye lens with a rated field of view of 200 degrees actually creates a 360×100 degree projection that covers one pole completely within an upper area 10 that is little more than half of a total spherical field of view, but omitting a lower area 11 including an opposing pole and much of the surrounding hemisphere, leaving this lower area 11 blank in any generated image. As shown in FIG. 5, one prior art parabolic mirror covers a central 60 degree strip of image 12 over 360 degrees of horizontal coverage, leaving large gaps 14 and 16 in coverage at the upper and lower poles of the sphere, respectively.

Figure 3:
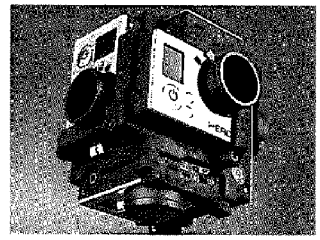
FIG. 3 is a graphic illustration of a prior art multi-camera panorama structure.

FIG. 3 illustrates a prior art multi-camera panorama structure, wherein the cameras are arranged radially such that their respective images have overlap. Recorded visual data may be stitched into one 360 degree image, wherein image data is extracted from each camera individually and then digitally processed in order to create a final image. However, the results are prone to stitching errors due to issues with camera alignment or frame synchronization. Stitching errors are often manifested as visible seams or other disjointed or unaligned image data perceived at the overlap of the stitched images.

Aspects of the present invention provide systems and methods for capturing fully spherical (360×180 degree field of view) images and videos while using a single lens assembly and a single camera. Embodiments include a central mirror element with a mirror surface angled to about 45 degrees and revolved into a cone shape about a central vertical axis. Other, outer refractive elements are disposed about the central mirror element relative to the central vertical axis and focus image light information acquired from the environment from an entire span of 360 degrees of horizontal perspective about the assembly onto the central mirror element mirror surface, which via the 45 degree orientation of the mirror surface, reflects or bends the light information oriented horizontally (generally along the horizontal, x-axis) 90 degrees straight down vertically toward an image receiver (camera, human eye, film, light sensor array elements, etc.)

In embodiments that incorporate outer fish-eye lens elements, the fish-eye may provide an effective vertical field of view of approximately 180 degrees, which is the entire or the maximum field of view vertically. More particularly, 180 degrees vertical span will be understood as defined by a semicircle drawn on a radius from the zero point on a vertical axis that is normal to a horizontal axis (or a horizontal plane defined by a plurality of horizontal axes oriented toward different degrees of 360 of horizontal coverage), thus starting and ending at positive and corresponding negative points of the radius value on the vertical axis. Wherein a fish eye lens structure is disposed entirely (360 degrees) about the vertical axis shared with the conical mirror element, said central mirror element reflects light information downward comprehensive enough to create a panoramic, 360 degrees horizontal field of view about whatever vertical field of view is provided by the surrounding reflective and refractive lens elements.

Figures 6, 7:
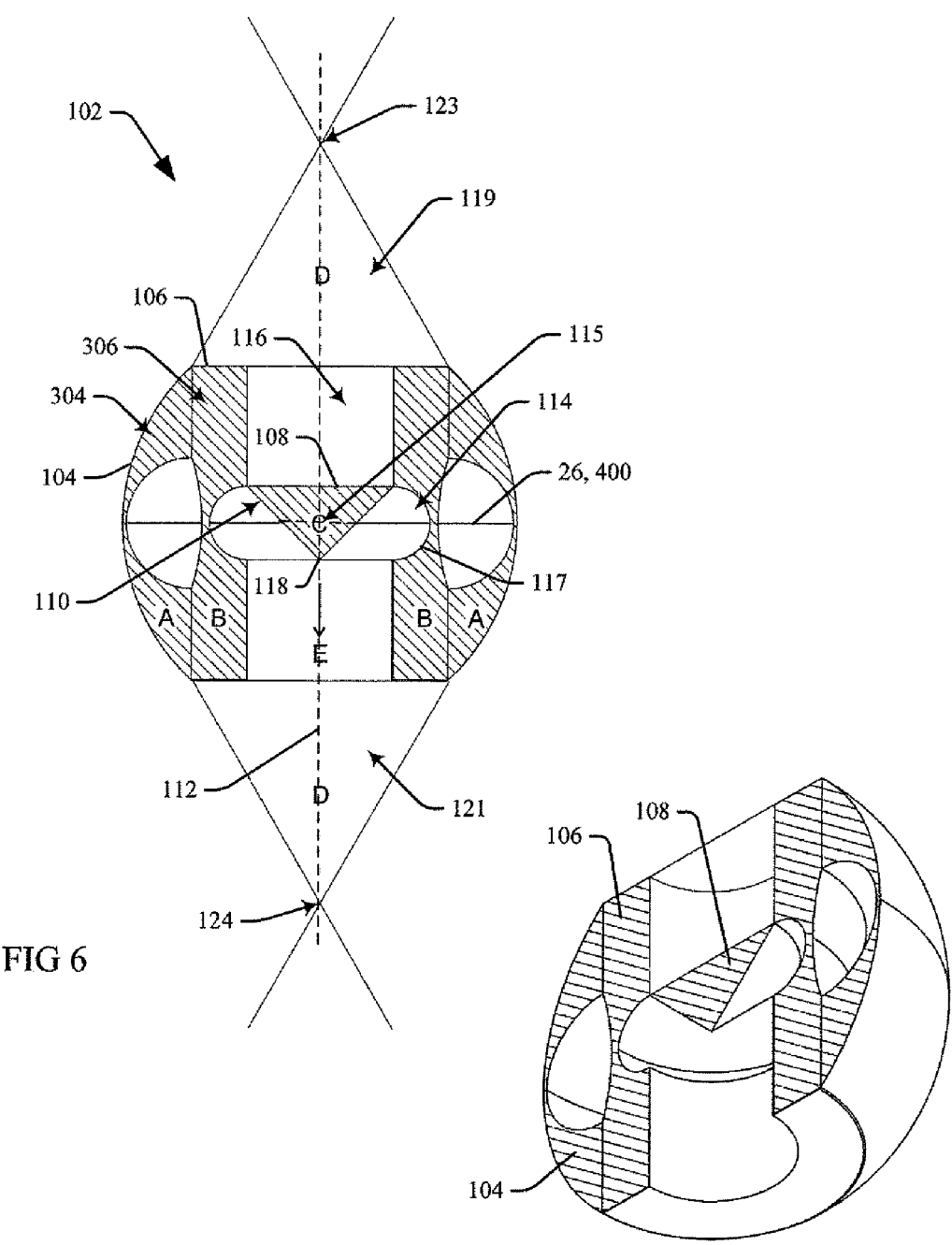
FIG. 6 is a cross-sectional view of a lens structure according to the present invention.
FIG. 7 is a perspective view of a lens structure according to the present invention.

FIG. 6 is a cross-sectional view of one example of a catadioptric fish eye lens structure 102 according to the present invention that is capable of capturing an image with a full 360 by 180 degree spherical field of view. FIG. 7 is perspective another view of a cross section of the structure 102. The structure 102 includes generally toroidal elements 104 and 106 that have refractive and reflective properties in focusing light information from the surroundings onto the conical mirror element 108, wherein the output of the lens is a polar projection reflected downward from the mirrored surface 110 of the conical mirror element that can be digitally processed into a rectilinear or other suitable projection as necessary. In many examples cases, a simple conversion from polar to Cartesian coordinates would be the only processing required.

More particularly, the structure 102 includes a negative meniscus, outer fisheye element 104 (labeled in FIG. 6 as "A"), a biconcave inner fisheye element 106 (labeled in FIG. 6 as "B"), and a conical mirror element 108 (labeled in FIG. 6 as "C") that are each aligned with each other with respect to a vertical centerline 112 that passes through a tip 118 of the downward-facing conical mirror surface 110 of the central conical element 108. The elements 104 and 106 may be described as "generally toroidal" with respect to the axis 112, in that their respective two-dimensional cross section shapes or profiles 304 and 306 are constant throughout a rotational perspective about the vertical axis 112, resulting in a three-dimensional toroid (or toroidal) form. However, the adjective "generally toroidal" refers to a shape resulting from maintaining the constant cross-section shape relative to the vertical axis 112, and it will be understood to be non-limiting with regard to the shape of the cross-sections and their resulting element 104 and 106 forms.

The areas labelled "D" in FIG. 6 indicates upper and lower visual dead zone areas 119 and 121, respectively (in this example, assuming a 210 degree field of view of the fisheye elements A and B). The directional arrow labelled as "E" indicates the downward direction (along the vertical axis 112) of image information output generated from the surrounding field of view as reflected by the conical mirror surface 110 to focusing optics or light sensor elements (not shown in this view) of a camera located to receive said reflected information.

FIG. 8 provides a diagrammatic view of an implementation of the structure 102 with elements of a camera, wherein captured light input 203 from the surrounding scene passes through the refractive fisheye elements 104 and 106 that reflect and redirect and otherwise translate the input 203 into a horizontal orientation 205 toward the conical mirror 108, which reflects said translated input 205 90 degrees vertically downward via the generally conical mirror surface 110 of the conical element 108 into downward image projection data 207. The downward image projection data 207 may be optionally focused via a focus array or other focusing optics 202 into a focused projection 209 toward an image plane 204 for receipt by one or more light sensitive sensor 212 (film element, array of electrical sensors, the retina of a human eye, etc.).

Embodiments may include modifications or variations to the conical mirror surface 110, for example to correct for visual distortion or chromatic aberrations, but they are generally conical and define a 45 degree angle with the vertical axis 112, in order to reflect the light downward by 90 degrees.

The structure 102 conveyed in FIG. 6 has an upward orientation when used to capture scene image data of surrounding scenes, wherein the axis 112 is vertical and normal to the horizontal axis 26 or plane 400 orientation. This enables the structure 102 to capture image information from all 360 degrees of a horizontal orientation rotating about the vertical axis 112. This is in contrast to the typical alignment of the lens elements of a conventional fisheye lens.

FIG. 9 is a perspective view of a cross-sectional view of a typical (prior art) fisheye lens 20 that comprises an outer lens element 22 and an inner lens element 23 that are aligned with respect to each by reference to a horizontal center-line or axis 26 of the lens 20. The center-line axis 26 indicates a viewpoint of the lens 20, and extends from a center 31 of a focal plane 24 of the conventional camera lens 20 and passes through a center 33 of the outer lens element 22, which defines the center of the field of view of the conventional lens 20, the central point of focus or reference of a surrounding scene, toward which the lens 20 is pointed. Thus, in one aspect, the center-line 26 indicates a horizontal orientation of the lens 20 toward the point of view, what the camera or viewer is pointing or looking at in order to gather visual image information. The cross section of the view of FIG. 9 is taken by a plane extending vertically through the horizontal axis 26, and discloses a cross section shape 28 of the outer fisheye lens element 22 and a cross section shape 30 of the inner fish eye lens element 23. Thus, the outer fisheye lens element 22 has a shape defined by revolving its cross section shape 28 around the horizontal centerline 26, and the inner fish eye lens element 23 has a shape defined by revolving its cross section shape 30 around the horizontal centerline 26.

More particularly, the elements 22 and 30 are formed or aligned about a central, horizontal axis 26 that is aligned generally horizontally, to capture a portion of the scene viewable from the orientation of the axis 26, wherein light information having some directional component 27 with a positive value toward and along the axis 26 is reflected by the outer lens 22 inwardly toward the inner component 30. The conventional fisheye 20 thus omits other light information reflected from the scene about the lens 20 that is oriented in an opposite direction 29, such as from image portions behind the lens 20, or is otherwise outside a range of the outer lens element 22 used to gather light information from the surrounding area.

Figure 11:
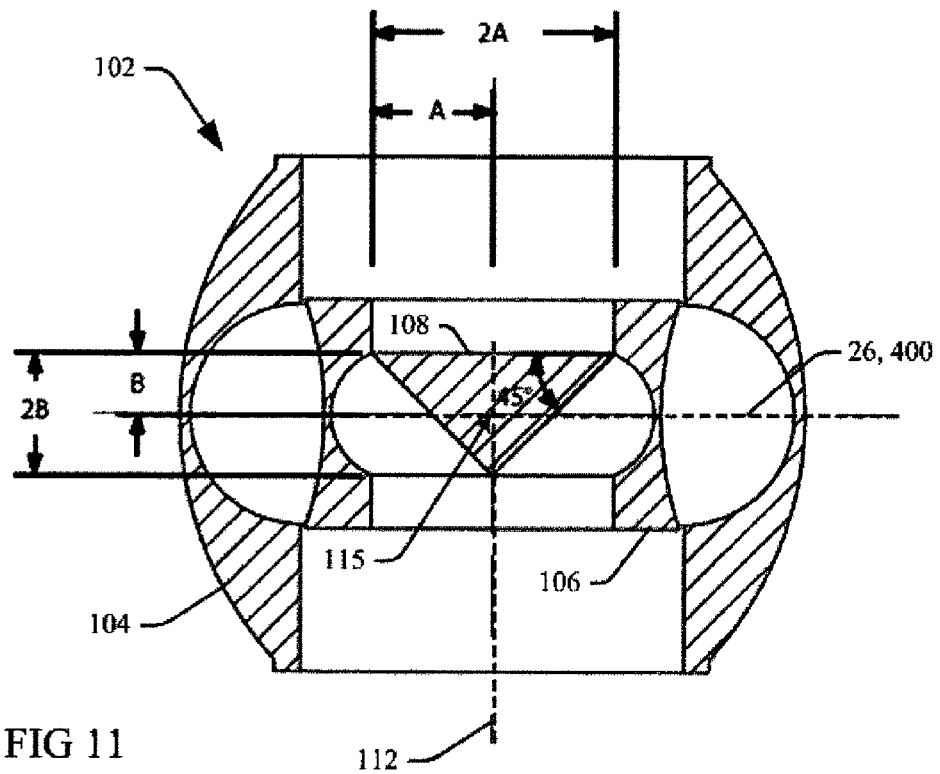
FIG. 11 is a sectional view of a lens structure according to the present invention corresponding generally to the view of FIG. 6.
Figure 13:
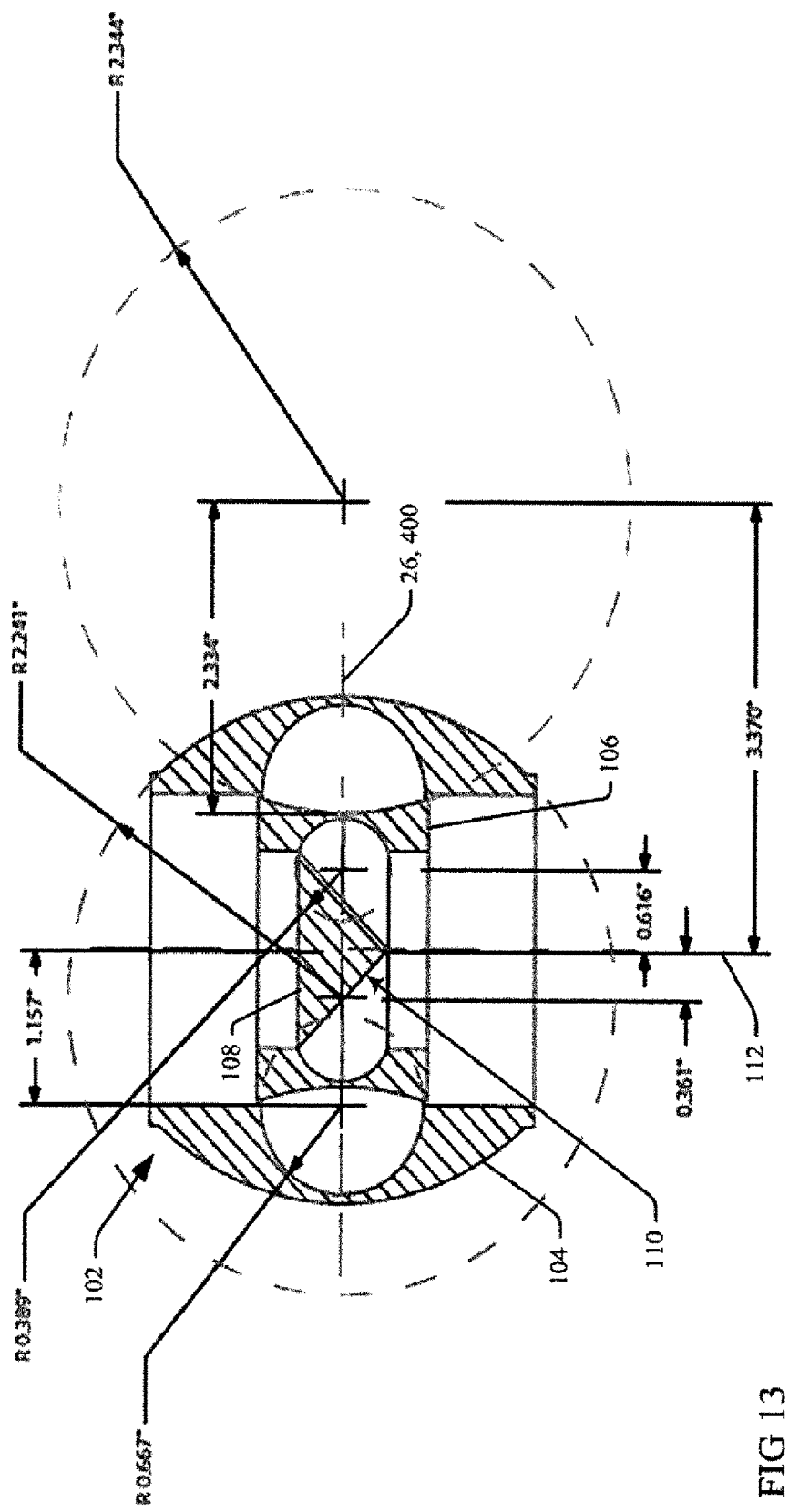
FIG. 13 is a sectional view of a lens structure according to the present invention and corresponding generally to the views of FIGS. 6, 11 and 12.

FIG. 10 is a perspective view of a cross-sectional view of the refractive fisheye elements 104 and 106 according to the present invention. The cross section of the view of FIG. 10 is taken by the same plane of FIG. 9, extending vertically through the horizontal axis 26. The inner and outer fisheye elements 104 and 106 are defined or formed with respect to the vertical axis 112 that is normal to a horizontal center-line or axis that is used to define a conventional fisheye lens or its orientation, resulting in shapes and resulting composite lens structures (for example, the embodiments of the structure 102 as illustrated in FIG. 6, 11, or 13) that are different and unique relative to a conventional fisheye lens system. More particularly, the outer refractive fisheye element 104 has a generally toroidal shape defined by revolving its cross section shape 304 vertically around a vertical center line 112 that is normal to the horizontal centerline 26, rather than about the horizontal centerline 26 as with the conventional outer fisheye lens element 22. The inner refractive fisheye element 106 also has a generally toroidal shape, defined by revolving its cross section shape 306 vertically around the same vertical center line 112.

The vertical centerline 112 is normal to the horizontal axis/centerline 26 of the conventional fisheye lens point of view, and indeed to a plane defined by a plurality of different horizontal axis/centerlines 26 that represent each of the 360 degrees of horizontal perspective of the lens 20 with respect to a surrounding scene. Thus, although the cross-section shape 28 of the outer element 22 of the conventional fisheye lens 20 may be similar or equivalent to the cross section shape 304 of the outer toroidal element 104, and the cross-section shape 30 of the inner element 23 may be similar or equivalent to the cross section shape 306 of the inner toroidal element 106, the shapes of outer elements 22 and 104 and the inner elements 23 and 106 differ relative to each other as formed (extruded, ground, etc.) as a result of being defined by revolving their cross-section shapes about the different, respective axes 26 and 112.

Referring again to FIG. 6, the conical mirror surface 110 shares the toroidal fisheye's vertical axis of revolution 112, is oriented with an angle of 45 degrees relative to the axis 112, and has a height dimension approximately equal to a height of a concavity 114 formed by an inner surface 117 of the interior lens element 106.

The fisheye elements 104 and 106, having been revolved 360 degrees around the vertical center line 112, will observe (acquire scene visual information) on an entire 360 degree field of view about the plane 400 formed about the center 112 and including the horizontal orientation axis 26. A 180 degree vertical field of view, spanning from any positive point value on the axis 112 above a zero value reference point 115 (defined at an intersection of the vertical axis 112 and a horizontal plane comprising the horizontal axes 26 over the 360 degrees of horizontal perspective) to the same value in negative on the axis 112 below the zero value point 115, is acquired by the fisheye elements 104 and 106 as a property of their cross-sectional shapes 304 and 306.

Additional angles of view acquired beyond 180 degrees may be used to fill in the "dead spot" areas of the cylindrical central cavity 116 formed in the inner lens element 106 and occupied by the conical mirror element 108, and the areas 119 and 121 above and below the structure 102. An angle value of coverage chosen beyond 180 degrees may be dependent on the configuration of the camera, and also on portions of the areas 116, 119 and 121 for which visual information is desired. For example, a 210 degree range of coverage may be selected in order to define the areas 119 and 121 to include objects in or close to the cylindrical cavity 116 that should remain unseen in the image data projected downward 209, allowing equipment such as mounting hardware, microphones, or other electronics located within the areas 119 and 121 to remain hidden, invisible to the camera. As will be appreciated by one skilled in the arts, the distance from the center point 115 along the central axis 112 of the lens to points 123 and 124 demarcating the ends of the blind spot areas 119 and 121 and from which objects become visible, decreases as the fisheye viewing angle increases above 180 degrees.

Aspects of the present invention may incorporate a wide variety of lens cross sections and configurations and transform them from conventional dimensions by revolving ("wrapping") them about the vertical axis 112 that is shared with the conical mirror surface 110. The dimensions of the interior cylindrical space 116 can be variable, and used to define the mirror surface 110 and element 108 sizes. In some examples the mirror surface is defined as a 45-degree cone, and the cone element 108 dimensions are generally proportionally constant, and its placement within the lens interior cavity 116 can be consistently established as a function of centerlines and other geometric relationships to the other lens elements 104 and 106.

Figure 12:
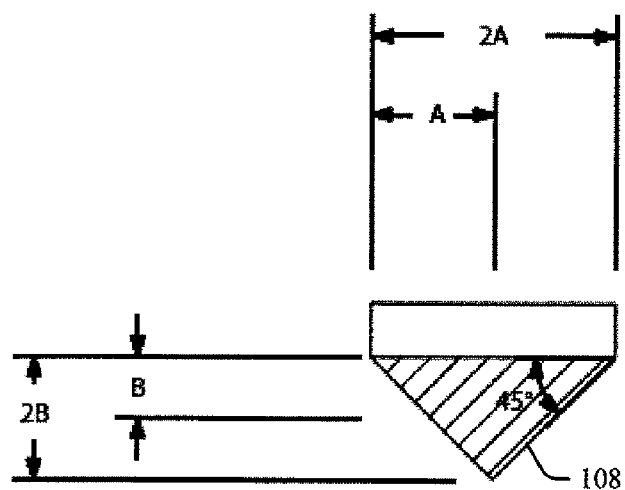
FIG. 12 is detail view of the sectional view of a cone element of FIG. 11.

FIG. 11 is another sectional view of the structure 102 and corresponding generally to the view of FIG. 6, and FIG. 12 is detail view of the sectional view of the cone element 108 of FIG. 11. The "A" and "B" labels in FIGS. 11 and 12 are provided to indicate common variables for the dimensions indicated, showing that they are linear multiples, wherein the numerical values are determined by the space available for mounting the cone 108. Both linear variable sets ("A" and "B") are shown at one and two-times value so as to indicate cone placement relative to the cone 108, the central vertical axis 112 and a horizontal plane 400 (that includes all of the horizontal axes 26 defining 360 degrees of horizontal perspective) that is normal to the axis 112 and passes through the central (zero) reference point 115 on said axis 112. In the present example, 2B=A, though other relationships between the variables may be practiced.

FIG. 13 is another sectional view of the structure 102 and corresponding generally to the views of FIGS. 6, 11 and 12, and depicts one example set of illustrative but not limiting radius and length and distance dimensions of attributes of the elements 104, 106 and 108 and their relative locations to each other. The mirror cone surface 110 is evenly bifurcated by horizontal plane 400. The dimensions and radiuses are selected to provide a 360 horizontal degree by 180 vertical degree coverage and the surrounding scene, and one skilled in the art will appreciate that they may be varied as necessary to provide such coverage.

Figure 14:
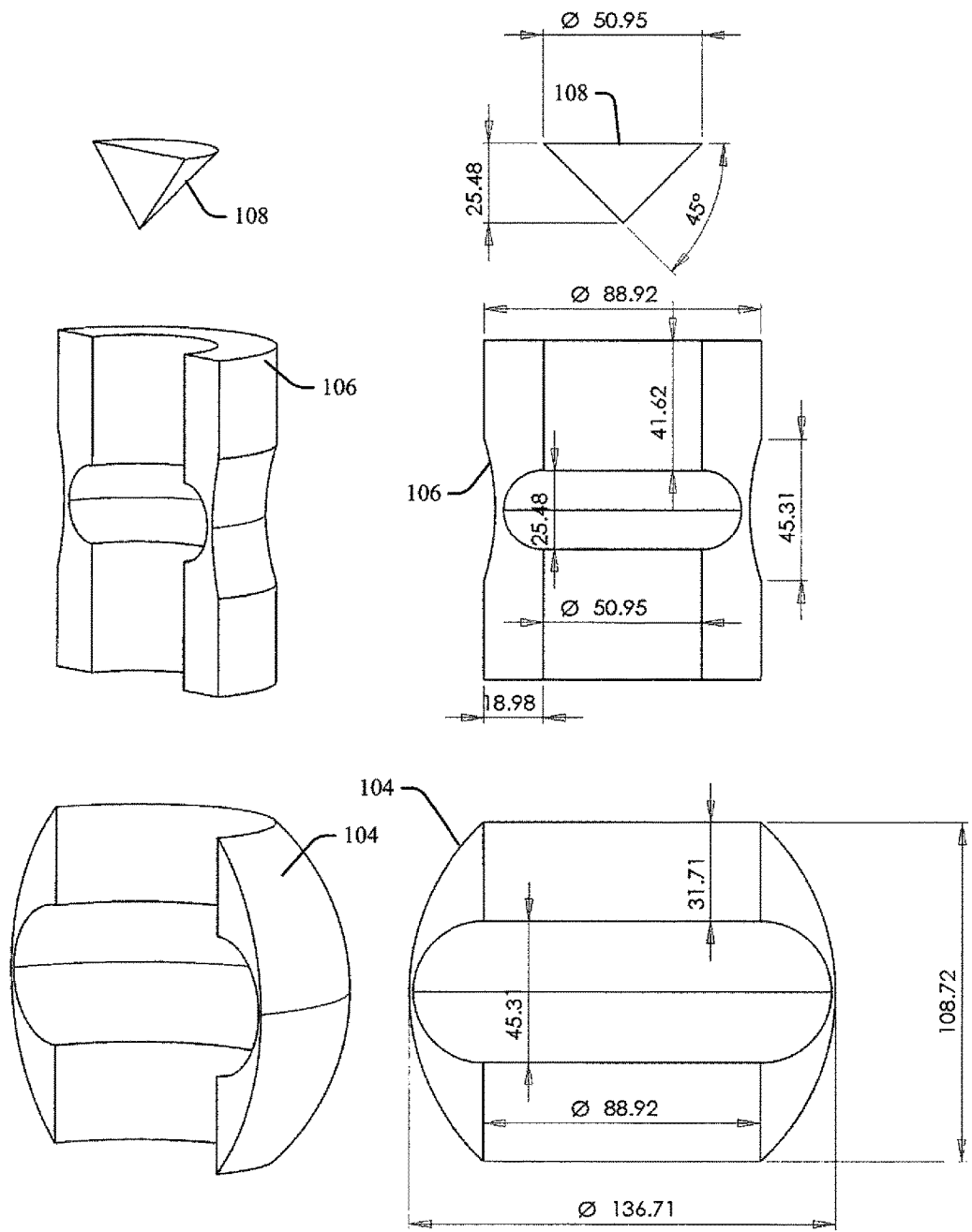
FIG. 14 provides a set of perspective and sectional views of a lens structure according to the present invention.

FIG. 14 provides another set of perspective and sectional views of the fisheye structure 102 elements 104, 106 and 108, and provides another, different example set of illustrative but non-limiting dimensions of the elements 104, 106 and 108.

Figure 15:
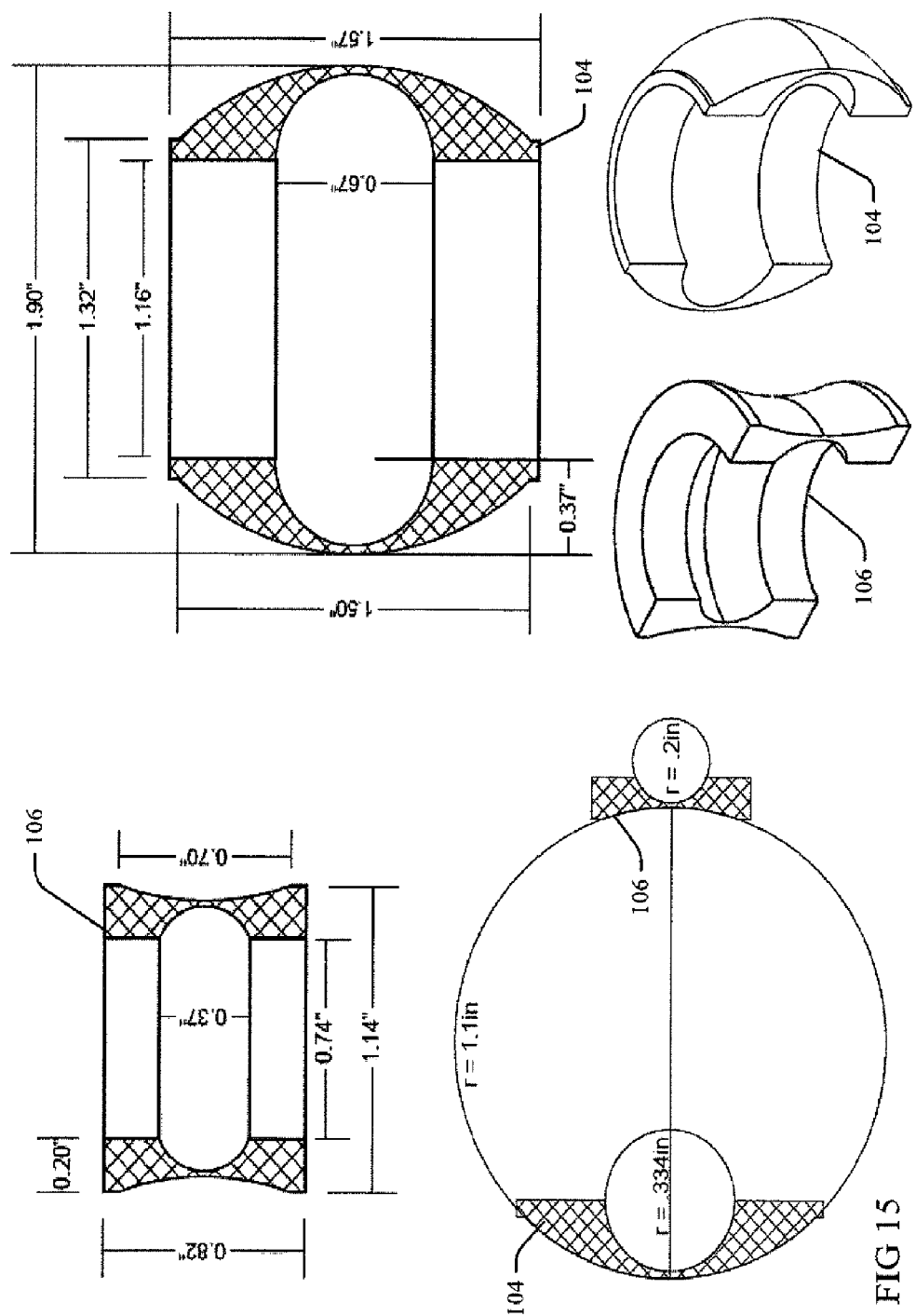
FIG. 15 provides a set of perspective and sectional views of a lens structure according to the present invention.

FIG. 15 provides a another set of perspective sectional views of the fisheye structure 102 elements 104 and 106, and provides another, different set of illustrative but non-limiting dimensions and their relations for forming an embodiment of the elements 104 and 106.

Any sort of refractive lens formula will be valid for this kind of a mirror concept, and embodiments are not limited to structure incorporating fisheye lens. Revolving refractive lens elements around a 45 degree cone in the center of the element side and reflecting visual information from the elements downward enable devices according to the present invention to take in a whole 360 degree view and combine it into an image data input to a light sensing element (film, digital light sensor arrays, etc.). Thus, whatever portion of the vertical field of view conveyed to the central mirror element, said particular portion field of view is used to generate a 360 degree horizontal band of visual information from the surroundings of the lens assembly.

Figure 16:
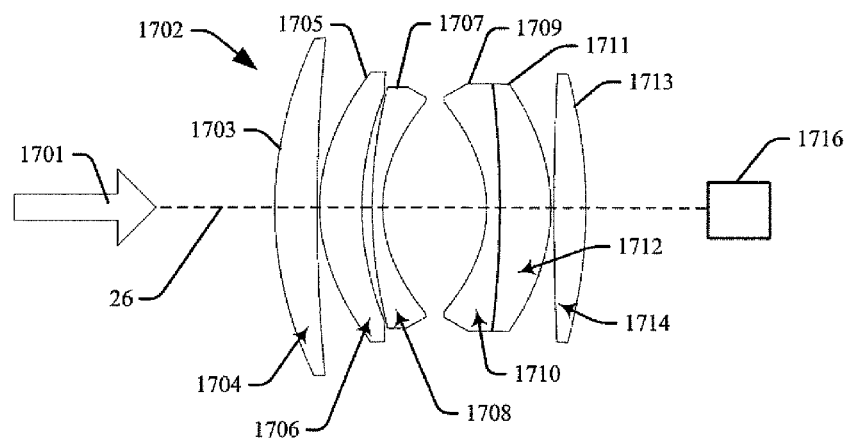
FIG. 16 provides graphic illustrations of cross sectional profiles of lens elements according to the present invention.
Figure 17:
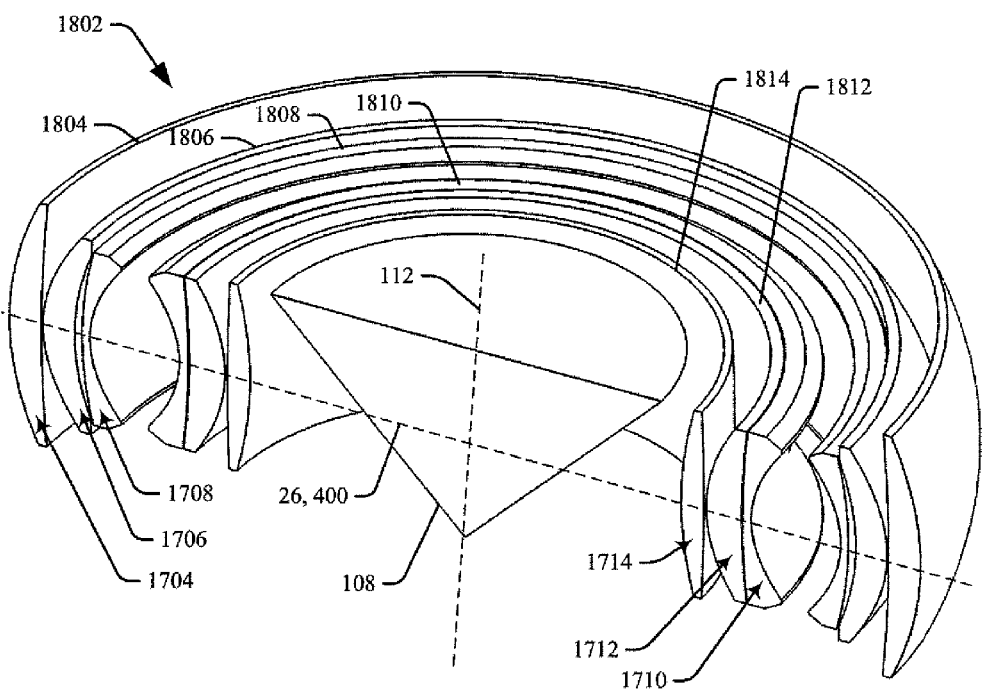
FIG. 17 provides graphic illustrations of a perspective and sectional views of lens elements according to the present invention.

FIG. 16 illustrates the cross sectional profiles 1704, 1706, 1708, 1710, 1712 and 1714 of elements 1703, 1705, 1707, 1709, 1711 and 1713 within a conventional 50 millimeter camera lens structure 1702, wherein an outermost lens 1703 gathers light image information 1701 from an illuminated scene and each of the other elements 1705, 1707, 1709, 1711 and 1713 of the respective profiles 1706, 1708, 1710, 1712 and 1714 progressively refract or otherwise transform the light information toward a sensor array 1716 with respect to a linear perspective along the horizontal axis 26. FIG. 17 illustrates a structure 1802 according to the present invention, comprising a plurality of elements 1804, 1806, 1808, 1810, 1812 and 1814 formed by revolving the respective cross section profile forms 1704, 1706, 1708, 1710, 1712 and 1714 of the 50 millimeter camera lens structure 1702 (FIG. 16) about the central cone 108 and the common central vertical axis 112, wherein the outermost lens element 1804 gathers light image information from 360 degrees of perspective from an illuminated scene about the horizontal plane 400 comprising the horizontal axis 26, and each of the other elements 1806, 1808, 1810, 1812 and 1814 progressively refract or otherwise transform the light information toward the conical mirror element 108 as a function of their profiles 1704, 1706, 1708, 1710, 1712 and 1714 that rotate about the central axis 112.

Figure 18:
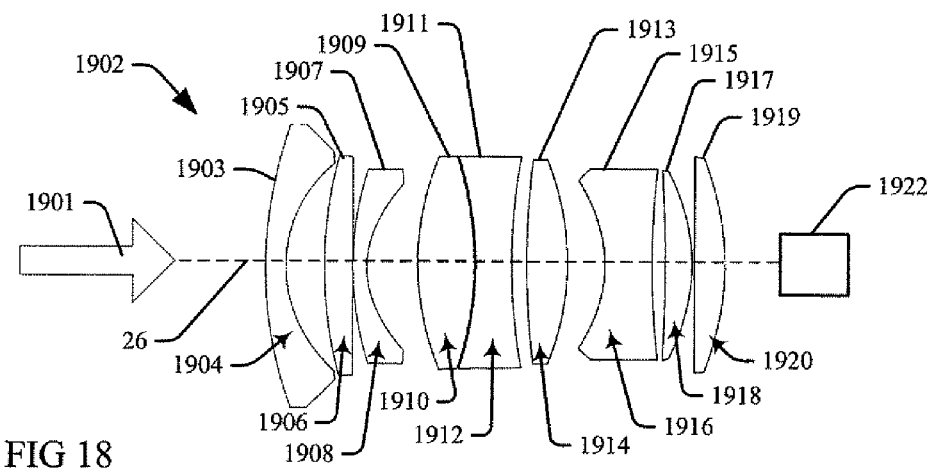
FIG. 18 provides graphic illustrations of cross sectional profiles of lens elements according to the present invention.

FIG. 18 illustrates the cross sectional profiles 1904, 1906, 1908, 1910, 1912, 1914, 1916, 1918 and 1920 of elements 1903, 1905, 1907, 1909, 1911, 1913, 1915, 1917 and 1919 within a conventional 28 millimeter camera lens structure 1902, wherein an outermost lens element 1903 profile 1904 gathers light image information 1901 from an illuminated scene and each of the other respective element profiles 1906, 1908, 1910, 1912, 1914, 1916, 1918 and 1920 progressively refract the light information toward a sensor array 1922 along the horizontal axis 26.

Figure 19:
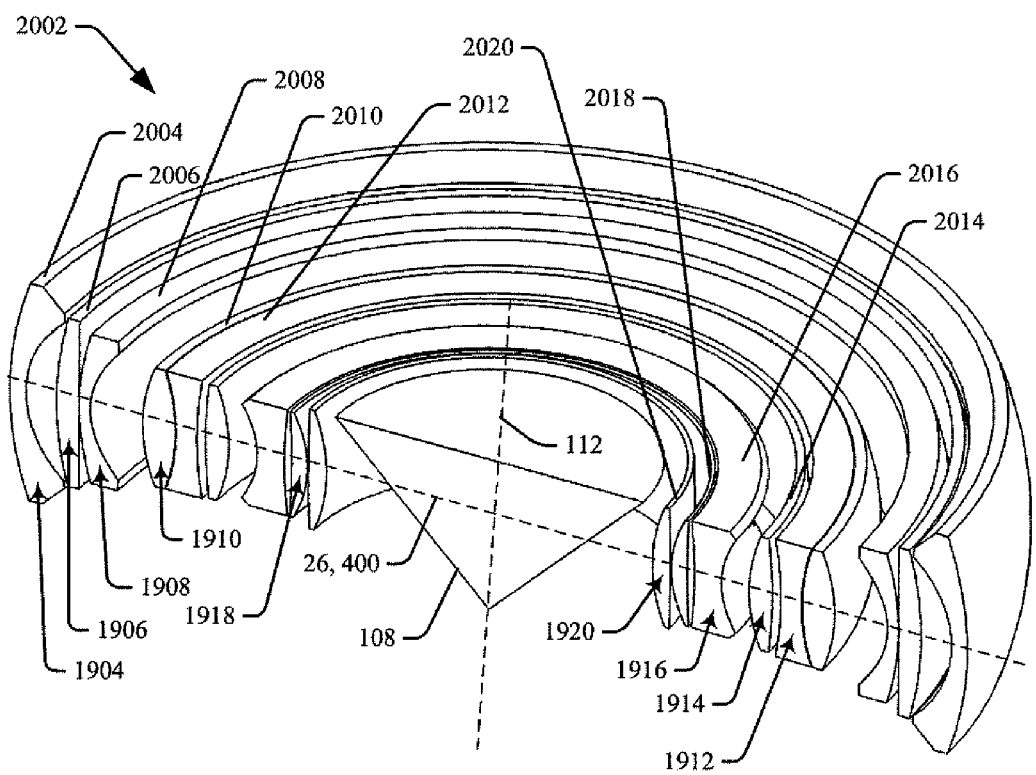
FIG. 19 provides graphic illustrations of a perspective and sectional views of lens elements according to the present invention.

FIG. 19 illustrates a structure 2002 according to the present invention, comprising a plurality of elements 2004, 2006, 2008, 2010, 2012, 2014, 2016, 2018 and 2020 that are formed and aligned to revolve the respective lens element cross section forms 1904, 1906, 1908, 1910, 1912, 1914, 1916, 1918 and 1920 of the 28 millimeter camera lens structure 1902 (FIG. 18) about the central cone 108 and the common central vertical axis 112. The outermost lens element 2004 gathers light image information as a function of its profile 1904 from 360 degrees of perspective from an illuminated scene about the horizontal plane 400 comprising the horizontal axis 26, and each of the other elements 2006, 2008, 2010, 2012, 2014, 2016, 2018 and 2020 progressively refract or otherwise transform the light information toward the conical mirror element 108 as a function of their profiles 1906, 1908, 1910, 1912, 1914, 1916, 1918 and 1920 that rotate about the central axis 112.

Figure 20:
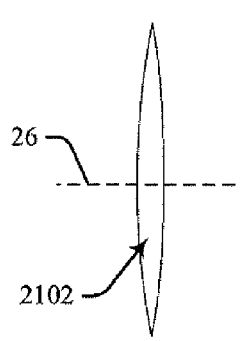
FIG. 20 provides graphic illustrations of a cross sectional profile of a lens element according to the present invention.
Figure 21:
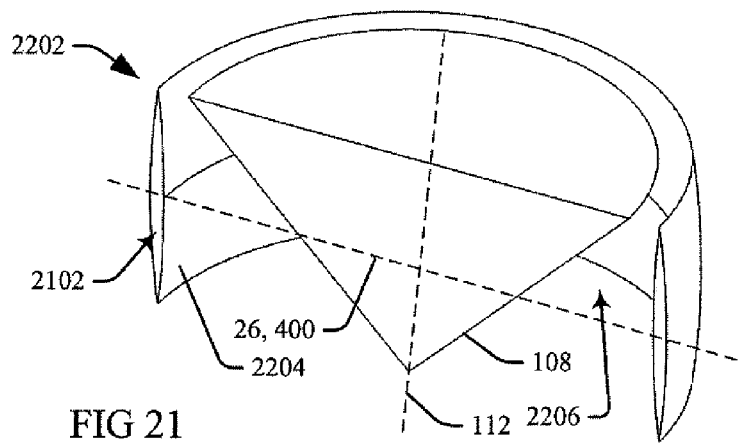
FIG. 21 provides graphic illustrations of a perspective and sectional views of lens elements according to the present invention.

FIG. 20 illustrates the cross sectional profile 2102 of a single, basic, thin prior art biconvex lens that gathers light image information from either side and refracts the gathered light passing through relative to the horizontal axis 26. FIG. 21 illustrates a structure 2202 according to the present invention, comprising an outer element 2204 formed by revolving the biconvex lens profile 2102 about the central cone 108 and the common central vertical axis 112. The outer lens element 2204 gathers light image information from 360 degrees of perspective from an illuminated scene about the horizontal plane 400 comprising the horizontal axis 26 and refract or otherwise transforms the light information toward the conical mirror element 108 that is located within a cylindrical void 2206 formed by the element 2204 as a function of its profile 2102 that rotates about the central axis 112.

The vertical field of view of non-fisheye structures, such as the examples 1802, 2002 and 2202, are not the 180 degrees of the fisheye, but less, and differ from each other as a function of the particular lens element geometries and relative alignments. For example, a 20 millimeter camera lens element cross section profile revolved about the axis 112 gives a 90 degree by 360 degree view; for a 300 millimeter, telephoto lens, a five degree by 360 degree view may be obtained.

Because the lens element shapes deployed with structures according to the present invention are revolved 360 degrees, the structures according to the present invention take an image from all 360 degrees horizontally surrounding the central conical mirror surface 110, focusing on the mirror, and then the mirror reflects it down by 90 degrees. This visual information reflected downward may be combined in the focal plane all into a single image that incorporates all of the 360 horizontal degrees.

Figure 22:
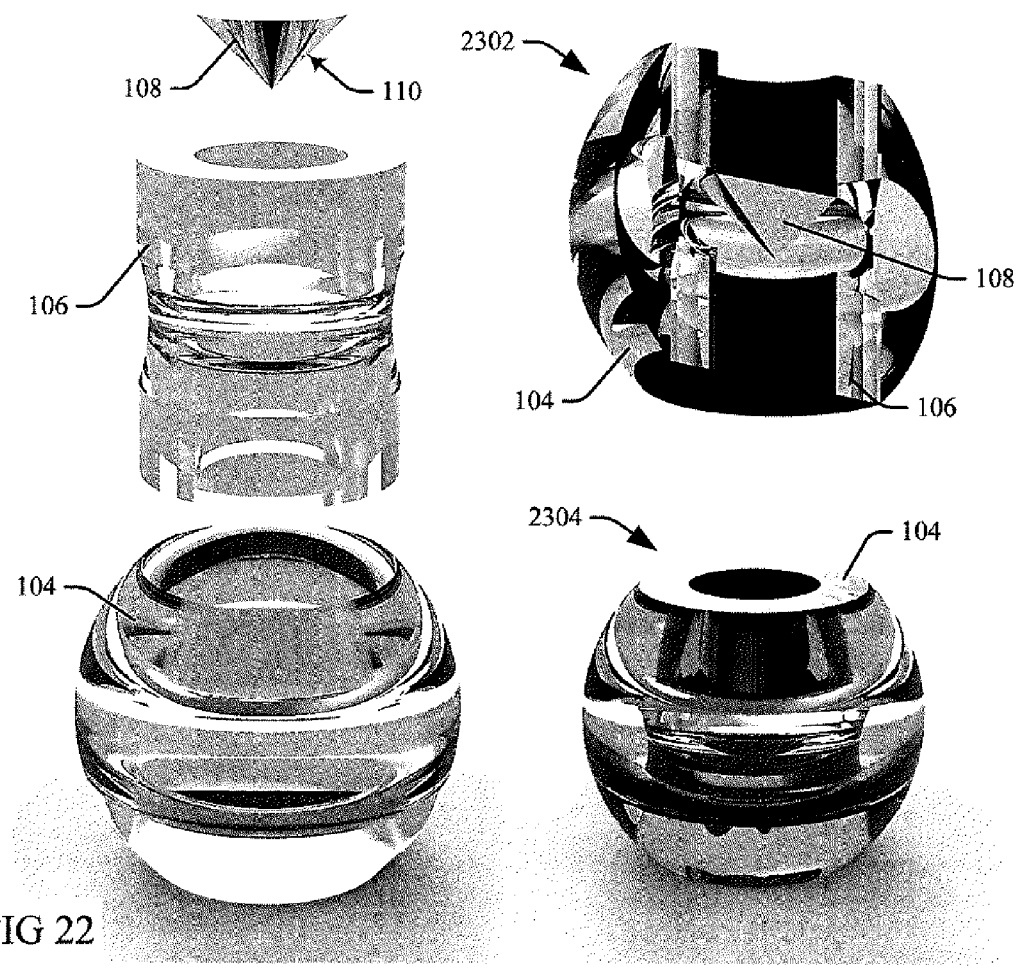
FIG. 22 provides photographic illustrations of perspective and cross sectional views of lens elements according to the present invention.

FIG. 22 provides photographic illustrations of embodiments of the central cone 108, the inner fisheye element 106 and the outer fisheye element 104; a perspective, cross-sectional view 2302 of the elements 104, 106 and 108 in assembly; and a perspective view 2304 of the elements 104, 106 and 108 in assembly; wherein the elements 104, 106 and 108 are formed by transparent and refractive materials (plastic, glass, etc.) and include a non-transparent, mirror finish on the cone surface 110.

Aspects may use a variety of techniques to convert the visual information 207 projected downward by the conical mirror surface 110 (and as optionally focused by a lens array 209) into meaningful or useful imagery and visual data. FIG. 23 illustrates a representation 2302 a simulated lens output of an original image, and a representation 2304 of a polar transformation or output 207 of the image data by the fish eye structure 102 as received by the focus array 202 (or optionally the focus output 209 generated by the lens array 209. A rectilinear representation 2306 is provided of the output data 2304 received by at the image plane 204 after conversion by a process according to the present invention. In some examples, the output information represented by 2304 is polar coordinates that are readily and/or automatically converted into recta-linear data and visual information for generating the rectilinear representation 2306.

Further, the image data captured and reflected downward from the conical mirror surface 110 may include more information than needed to convert to desired image formats. Thus, some embodiments automatically crop out or otherwise filter out unneeded data in order to create useful image data.

FIG. 24 illustrates a method according to the present invention for capturing image information from a surrounding scene and generating a photographic representation of the surrounding scene. At 2402 light input data is captured from a surrounding scene via one or more lens elements that is/are disposed about a conical element as discussed in the examples above. Thus, the conical element is defined about a vertical axis and has a tip on the vertical axis, wherein the conical element has a conical mirror surface that is defined upward from the tip on a generally 45 degree angle to the vertical axis, wherein the lens element(s) define a generally cylindrical void that encloses the conical element. The lens element(s) have a cross sectional shape defined relative to a plane passing through the at least one lens element and including the vertical axis, wherein the lens element cross sectional shape(s) are constant in rotation about the vertical axis and impart generally toroid shapes to the lens elements relative to the vertical axis.

At 2404 the captured light input is translated, as a function of the cross sectional shape(s) of the lens element(s), into horizontal projection data that is oriented toward the conical mirror surface. At 2406 the horizontal projection data is reflected 90 degrees vertically downward by the conical mirror surface as polar coordinate image projection data toward an image plane for receipt by at least one light sensitive sensor. At 2408 the polar coordinate image projection data is converted into rectilinear visual information.

At 2410 a photographic representation of the surrounding scene is generated from the converted, rectilinear visual information (data).

In some aspects, adjustment mechanisms are provided to focus the visual information reflected downward by the conical mirror surface 110 onto the focal plane. For example, an adjustment screw mechanism (not shown) may be provided to adjust a distance (or other spatial relationship) of the conical mirror surface 110 relative to the focal plane, to dial in the mirror 110 location in relation to the camera plane. Other examples may use an adjustable lens (not shown) interposed between the conical mirror surface 110 onto the focal plane, which may be mechanically manipulated to change the focus, as will be appreciated by one skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes transitory, propagation or carrier wave signals or subject matter and includes an electronic, magnetic, optical or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that does not propagate but can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

Referring now to FIG. 25, an exemplary computerized implementation of an aspect of the present invention includes a computer system or other programmable device 522 in communication 520 with one or more focal plane sensors 540, 542 and/or 544 that receive the polar coordinate image projection data from the conical mirror surface as described above. The programmable device 522 is also in communication with one or more image data capture devices. The programmable device 522 is further in communication with a display screen 534 and a storage device 532.

Instructions 542 reside within computer readable code in a computer readable memory 536, or in a computer readable storage system 532 that is accessed by a Central Processing Unit (processor or CPU) 538 of the programmable device 522. An input/output device (I/O) 524 further enables wireless communications and other inputs and outputs. Thus, the instructions, when implemented by the processor 538, cause the processor 538 to display to a user via the display screen 534, an image of surroundings of the user from image data captured by the image capture device 542; display via the display screen 534, photographic representation of a surrounding scene is generated from the converted, rectilinear visual information (data).

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
   a conical element defined about a vertical axis and having a tip on the vertical axis, and a conical mirror surface that is defined upward from the tip on a generally 45-degree angle to the vertical axis; and
   at least one lens element disposed about the conical element, wherein the at least one lens element defines a generally cylindrical void that encloses the conical element, wherein the at least one lens element has a cross-sectional shape defined relative to a plane passing through the at least one lens element and including the vertical axis, wherein the at least one lens element cross-sectional shape is constant in rotation about the vertical axis and imparts a generally toroid shape to the at least one lens element relative to the vertical axis;
   wherein the cross-sectional shape of the at least one lens element is selected to capture light data input from a surrounding scene and translate the captured light data into a horizontal orientation toward the conical mirror surface, which is reflected by the conical mirror surface 90 degrees vertically downward into downward image projection data toward an image plane for receipt by at least one light sensitive sensor; and
   wherein the at least one lens element is a plurality of lens elements that comprise:
   an outer negative meniscus element that has a first cross-sectional shape that captures the light input from a surrounding scene and translates the captured light input into a first projection of the captured light data that is oriented toward the conical mirror surface on a first generally horizontal orientation; and
   a biconcave inner element that is disposed between the outer negative meniscus element and the conical element and that has a second cross-sectional shape that translates the first projection of the captured light data from the outer negative meniscus element into a second projection toward the conical mirror surface, wherein the second projection has a second generally horizontal orientation that is different from the first generally horizontal orientation.

2. The system of claim 1, further comprising:
   at least one focusing optic element disposed between the conical mirror surface and the image plane that focuses the downward image projection data onto the image plane.

3. The system according to claim 1, wherein the conical mirror surface comprises variations to the 45-degree angle with the vertical axis to correct for visual distortion or chromatic aberrations.

4. The system of claim 1, wherein the first cross-sectional shape is different from the second cross-sectional shape.

5. The system of claim 1, wherein the first cross-sectional shape of the outer negative meniscus element is defined by a planar cross-sectional shape of an outer element of a conventional camera lens taken on a plane that extends vertically through a horizontal axis that extends from a focal plane of the conventional camera lens and passes through a center of a field of view of the conventional lens; and
   wherein the second cross-sectional shape of the biconcave inner element is defined by a planar cross-sectional shape of an inner element of the conventional camera lens taken on a plane extending vertically through the horizontal axis.

6. The system according to claim 1, wherein the conventional camera lens is a fisheye lens, and wherein the downward image projection data conveys visual information from an entirety of the surrounding scene that spans the surrounding scene 180 degrees vertically by 360 degrees horizontally.

7. The system according to claim 1, wherein the downward image projection data is polar projection data, the system further comprising:

a processor in circuit communication with a computer readable memory and a computer readable storage medium, wherein the processor executes program instructions stored on the computer-readable storage medium via the computer readable memory and thereby converts the downward image polar projection data into recta-linear visual information for generating a rectilinear photographic representation of the surrounding scene.

8. A method for capturing image information from a surrounding scene and generating a photographic representation of the surrounding scene, the method comprising:

capturing light input from a surrounding scene via at least one lens element that is disposed about a conical element, wherein the conical element is defined about a vertical axis and has a tip on the vertical axis, wherein the conical element has a conical mirror surface that is defined upward from the tip on a generally 45 degree angle to the vertical axis, wherein the at least one lens element defines a generally cylindrical void that encloses the conical element, wherein the at least one lens element has a cross-sectional shape defined relative to a plane passing through the at least one lens element and including the vertical axis, wherein the at least one lens element cross-sectional shape is constant in rotation about the vertical axis and imparts a generally toroid shape to the at least one lens element relative to the vertical axis;

translating, as function of the cross-sectional shape of the at least one lens element, the captured light input into at least one horizontal projection that is oriented toward the conical mirror surface; and reflecting, via the conical mirror surface, the at least one horizontal projection of the captured light input 90 degrees vertically downward into downward image projection data toward an image plane for receipt by at least one light sensitive sensor;

wherein at least one lens element is a plurality of lens elements that comprises an outer negative meniscus element and a biconcave inner element that is disposed between the outer negative meniscus element and the conical element, the method further comprising:

capturing, as a function of a first cross-sectional shape of the outer negative meniscus element, the light input from a surrounding scene;

translating, as a function of the first cross-sectional shape of the outer negative meniscus element, the light input captured from the surrounding scene into a first projection of the captured light data that is oriented toward the conical mirror surface on a first generally horizontal orientation: and translating, as a function of a second cross-sectional shape of the biconcave inner element, the first projection of the captured light data from the outer negative meniscus element into a second projection toward the conical mirror surface, wherein the second projection has a second generally horizontal orientation that is different from the first generally horizontal orientation.

9. The method of claim 8, further comprising:

focusing the downward image projection data onto the image plane via at least one focusing optic element that is disposed between the conical mirror surface and the image plane.

10. The method according to claim 8, wherein the conical mirror surface comprises variations to the 45-degree angle with the vertical axis to correct for chromatic aberrations.

11. The method of claim 8, wherein the first cross-sectional shape is different from the second cross-sectional shape.

12. The method according to claim 8, further comprising:

defining the first cross-sectional shape of the outer negative meniscus element by a planar cross-sectional shape of an outer element of a conventional camera lens taken on a plane that extends vertically through a horizontal axis that extends from a focal plane of the conventional camera lens and passes through a center of a field of view of the conventional lens; and defining the second cross-sectional shape of the biconcave inner element by a planar cross-sectional shape of an inner element of the conventional camera lens taken on a plane extending vertically through the horizontal axis.

13. The method of claim 12, wherein the conventional camera lens is a fisheye lens, and wherein the downward image projection data conveys visual information from an entirety of the surrounding scene that spans the surrounding scene 180 degrees vertically by 360 degrees horizontally.

14. The method according to claim 8, wherein the downward image projection data is polar projection data, the method further comprising:

converting the downward image polar projection data into recta-linear visual information; and generating a photographic representation of the surrounding scene from the rectilinear visual information.

* * * * *